United States Patent
Youngs et al.

(10) Patent No.: US 8,543,403 B1
(45) Date of Patent: Sep. 24, 2013

(54) INTELLIGENT INFORMATION SUPPLEMENTS TO CALLS

(75) Inventors: Simon Youngs, Overland Park, KS (US); Gary Duane Koller, Overland Park, KS (US); Piyush Jethwa, Overland Park, KS (US); Mark Douglas Peden, Olathe, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 771 days.

(21) Appl. No.: 12/767,284

(22) Filed: Apr. 26, 2010

(51) Int. Cl.
*G10L 15/08* (2006.01)

(52) U.S. Cl.
USPC ............................................. 704/251

(58) Field of Classification Search
None
See application file for complete search history.

(56) References Cited

U.S. PATENT DOCUMENTS

| | | | | |
|---|---|---|---|---|
| 6,411,683 B1 * | 6/2002 | Goldberg et al. | ......... | 379/88.01 |
| 7,716,054 B2 * | 5/2010 | Harris et al. | ................. | 704/270 |
| 8,370,145 B2 * | 2/2013 | Endo et al. | ................... | 704/255 |
| 2004/0008828 A1 * | 1/2004 | Coles et al. | ............... | 379/88.01 |
| 2008/0209309 A1 * | 8/2008 | Zhang et al. | ................. | 715/205 |
| 2009/0254618 A1 * | 10/2009 | Arnold et al. | ................ | 709/206 |
| 2009/0257566 A1 * | 10/2009 | Dixon | ....................... | 379/88.04 |
| 2010/0121629 A1 * | 5/2010 | Cohen | ............................. | 704/2 |
| 2010/0159942 A1 * | 6/2010 | Lewis et al. | ............... | 455/456.1 |
| 2010/0178903 A1 * | 7/2010 | Tofighbakhsh et al. | .... | 455/414.3 |

OTHER PUBLICATIONS

Call Whisper, Wikipedia, the free encyclopedia, last modified Apr. 1, 2010. http://en.wikipedia.org/wiki/Call_Whisper.

* cited by examiner

*Primary Examiner* — Talivaldis Ivars Smits (57) ABSTRACT

Embodiments of the present invention provide systems, methods, and computer-readable media for providing supplemental information to callers during a call. In embodiments, a call is initiated between a first caller and a second caller. Information communicated during the call is monitored to determine that a keyword has been spoken. Supplemental information associated with the keyword is identified, and the supplemental information is provided to the first caller during the call.

19 Claims, 11 Drawing Sheets

510 — FIRST CALLER:
   I HEAR YOU'RE GOING TO A CONFERENCE SOON?

520 — SECOND CALLER:
   YES, IT'S IN AMSTERDAM.

510 — FIRST CALLER:
   HOW IS THE WEATHER IN AMSTERDAM?
                    550        560
530 — SUPPLEMENTAL INFORMATION TO FIRST CALLER:
   *IT IS CURRENTLY 70 DEGREES FAHRENHEIT IN AMSTERDAM.*

520 — SECOND CALLER:
   I'M NOT SURE, BUT HOPEFULLY IT'S NICE.

510 — FIRST CALLER:
   I THINK YOU'LL SEE SOME VERY TEMPERATE DAYS.

520 — SECOND CALLER:
   WHAT ABOUT YOU? HOW IS THE TEMPERATURE IN SAN ANTONIO?
                                         555
           570
530 — SUPPLEMENTAL INFORMATION TO FIRST CALLER:
   *THE WEATHER IN SAN ANTONIO IS 98 DEGREES FAHRENHEIT.*

510 — FIRST CALLER:
   OH, IT'S TOO HOT TO GO OUTDOORS. I'LL BE ENVYING YOU IN EUROPE.

610 — FIRST CALLER (ADAM):
　　　　HOW WAS YOUR TRIP? IT MUST BE NICE TO BE
　　　　HOM<u>E</u>.
　　　　　　↖660
630 — SUPPLEMENTAL INFORMATION TO FIRST CALLER:
　　　　*JIM'S WIFE IS NAMED ANNA.*

620 — SECOND CALLER (JIM):
　　　　YES, IT'S GREAT TO SEE MY KID<u>S</u>.
　　　　　　　　　　　　　　↖670
630 — SUPPLEMENTAL INFORMATION TO FIRST CALLER:
　　　　*JIM HAS A DAUGHTER NAMED EMILY AND A SON
　　　　NAMED JACK.*

610 — FIRST CALLER (ADAM):
　　　　HOW ARE JACK AND EMILY, ANYWAY?

620 — SECOND CALLER (JIM):
　　　　THEY'RE GREAT, THANKS FOR ASKING. IT SEEMS
　　　　LIKE THEY GROW UP SO FAST.

710 — FIRST CALLER:
   THIS IS A PRETTY CLOSE ELECTION, EH?

720 — SECOND CALLER:
   YES, I'M TRYING TO FIND A CHANNEL THAT'S COVERING THE RACE.

730 — SUPPLEMENTAL INFORMATION TO FIRST CALLER:
   *MACON COUNTY HAS GONE TO CANDIDATE JONES.*

710 — FIRST CALLER:
   OH, I JUST HEARD MACON COUNTY WENT FOR JONES.

720 — SECOND CALLER:
   THANKS FOR LETTING ME KNOW! KEEP ME UPDATED!

FIG. 7

820 — SECOND CALLER:
   WOW, THIS IS A LONG AUDIO CLASS. I CAN'T BELIEVE WE'RE MISSING THE PLAYOFFS.

830 — SUPPLEMENTAL INFORMATION TO FIRST CALLER:
   *SIXTH INNING. YANKEES 4, RED SOX 6.*

810 — FIRST CALLER:
   I KNOW, BUT EDUCATION IS ESSENTIAL TO SUCCESS.

840 — [FIVE MINUTES LATER]

830 — SUPPLEMENTAL INFORMATION TO FIRST CALLER:
   *SIXTH INNING. YANKEES 4, RED SOX 9.*

840 — [FIVE MINUTES LATER]

820 — SECOND CALLER:
   I'M GOING TO HEAD OUT. I CAN'T MISS THE END OF THE GAME.

830 — SUPPLEMENTAL INFORMATION TO FIRST CALLER:
   *SIXTH INNING. YANKEES 4, RED SOX 9.*

810 — FIRST CALLER:
   OK, YOU GO AHEAD. I'LL TAKE NOTES FOR YOU.

820 — SECOND CALLER:
   I WISH I HAD YOUR SELF-CONTROL.

INTELLIGENT INFORMATION SUPPLEMENTS TO CALLS

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features of the claimed subject matter, nor is it intended to be used as an aid in isolation to determine the scope of the claimed subject matter.

As information becomes increasingly available, individuals can benefit from having access to supplemental information during voice calls. While individuals on a voice call may have access to a computing device that may be used to look up information during the call, the process of looking up information may leave the caller distracted and may cause other parties on the call to wait for the information to be retrieved. As such, individuals can benefit from having access to supplemental information that may be provided to the individuals during a voice call.

In a first aspect, a set of computer-usable instructions provide a method of providing supplemental information to callers during a call. The method includes initiating the call between a first caller and a second caller. The information communicated during the call is monitored. Based on an analysis of information communicated during the call, a first keyword is determined to have been communicated during the call. Further, a first set of supplemental information that is associated with the first keyword is identified. The first set of supplemental information is stored in a database. The first set of supplemental information is retrieved from the database. Additionally, the first set of supplemental information is provided to the first caller. In particular, the first set of supplemental information is provided to the first caller during the call.

In a second aspect, a set of computer-usable instructions provide a method of providing supplemental information to callers during a call. The method includes initiating the call between a first caller and a second caller. The information communicated during the call is monitored. Further, an average auditory volume of the second caller is determined. In particular, the average auditory volume of the second caller is determined based on an analysis of information communicated during the call. Additionally, a determination is made that a keyword has been communicated during the call. As with the determination of the average auditory volume, the determination that a keyword has been communicated during the call is based on the analysis of information communicated during the call. Supplemental information that is associated with the keyword is identified. Further, the supplemental information is retrieved. Additionally, the supplemental information is translated into an audible format. The audible supplemental information is then provided to the first caller at a volume that is at least a threshold amount softer than the average audible volume of the second caller. Further, the audible supplemental information is provided to the first caller during the call.

In a third aspect, a set of computer-usable instructions provide a method of providing supplemental information to callers during a call. The method includes initiating the call between a first caller and a second caller. Supplemental information updates associated with the second caller are requested. A search for updated supplemental information is periodically performed. Additionally, updated supplemental information is identified. The updated supplemental information is then retrieved. Further, the updated supplemental information is provided to the first caller. In particular, the updated supplemental information is provided to the first caller during the call.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD-ROM | Compact Disk Read Only Memory |
| DTMF | Dual-Tone Multi-Frequency Signaling |
| DVD | Digital Versatile Discs |
| EEPROM | Electrically Erasable Programmable Read Only Memory |
| GPS | Global Positioning Service |
| HLR | Home Location Register |
| LAN | Local Area Network |
| MP3 | MPEG-1 Audio Layer 3 |
| MSC | Mobile Switching Center |
| PC | Personal Computer |
| PDA | Personal Digital Assistant |
| PIM | Personal Information Management |
| RAM | Random Access Memory |
| ROM | Read Only Memory |
| SCP | Service Control Point |
| SN | Service Node |
| WAN | Wide Area Network |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for providing supplemental information to a caller during a voice call (hereinafter, "call"). In particular, embodiments of the present invention provide systems and methods of providing supplemental information that is based on content of the call or the calling parties of the call. For example, a first caller may initiate a call to a second caller to inquire about the second caller's business. In order to personalize the call, the first caller may be provided with supplemental information to remind the first caller of topics that are of interest to the second caller. This supplemental information may be provided to the first caller by an information system.

An information system is a service that provides supplemental information in response to requests. Additionally, an information system may identify and retrieve information that may be of interest to a customer of the service, such as a caller who requests supplemental information. An information system may store supplemental information about a particular caller, such as a first caller. This information may have been previously stored. Alternatively, an information system may search databases to determine information that is relevant to the first caller.

Further, the information system may reference an auditory translation of material from text-based sources. This means that a caller may receive text-based supplemental information in an auditory format. For example, if a second caller asks the first caller "Do you know the score?" in reference to an identified football game, the information system may look up and retrieve the supplemental information in a text format, and deliver supplemental information that includes the game's score in an audible format to the first caller so that the first caller may pass on the supplemental information to the second caller.

The supplemental information, provided by the information system to the first caller, may be provided in a format that is heard only by the first caller. For instance, the supplemental information may be "whispered" to the first caller. Information may be whispered to a first caller by playing the supplemental information into the first caller's earpiece at a volume that is audible to the first caller only. In this way, the supplemental information is played to the first caller at a low enough volume that the second caller is not able to hear the supplemental information. For example, the supplemental information is played to the first caller at a threshold amount of volume below that of the second caller's voice. The volume of the second caller's voice may be used as a gauge of an appropriate volume at which to present the supplemental information that is audible to the first caller. The threshold amount of volume below that of the second caller's voice may be used as a gauge of an appropriate threshold amount of volume to present the supplemental information such that the second caller is not able to hear the supplemental information through feedback noise of the computing devices used to communicate the call. In embodiments, computing devices may comprise mobile devices.

Alternatively, in order to keep the second caller from hearing the supplemental information presented to the first caller, the volume of auditory information originating from the first caller may be decreased or muted during the period that the supplemental information is provided to the first caller. As such, a second caller may not be exposed to feedback noise from the supplemental information being played to the first caller.

As discussed above, supplemental information may be provided to a first caller in response to detection of a keyword. In particular, during a call between a first caller and a second caller, information communicated between the callers may be analyzed to determine whether a keyword has been spoken. One or more keywords may be provided by the first caller to a keyword monitoring service. The keyword monitoring service is a service that may detect keywords present in information communicated during calls. The keyword monitoring service may be provided keywords from the first caller to monitor in particular conversations. Alternatively, one or more keywords to be monitored may be determined from a profiling service to determine keywords that are relevant to the first caller. The profiling service is a service that analyzes information associated with callers, such as information that is provided by callers. Further, the keywords provided to the keyword monitoring service may be categorized based on a party being called. For instance, if the first caller is calling a second caller who is an electrical engineer, the keywords relating to that second caller may contain words such as "circuit board," "network," and "information management." In contrast, if the first caller is calling a second caller who is an avid sports fan, keywords may include words such as "football," "touchdown," or "playoffs." As such, keywords may be specific to parties participating in a call.

Additionally, supplemental information provided to a first caller may be based on the originating source of the keyword. In examples above, supplemental information may be provided based on a keyword being spoken from either party. Alternatively, supplemental information may be provided based on a keyword being spoken from a particular party, such as the first caller. For example, a first caller may program a nugget server to retrieve information relating to content of a call, calling parties on a call, or both, in response to the detection of a keyword that is spoken by the first caller.

Further, keywords may be content-specific. In embodiments, the contextual basis of a call may be provided by a first caller, may be determined based on keywords, or may be determined based on parties of the call, etc. For example, if the content of a call includes topics relating to a cooking class, the use of phonetic terms "pie" and "flour" during the call may be keywords associated with information relating to cooking. As such, supplemental information retrieved in response to the detection of the word "pie" or "flour" may include cooking tips for making a pie. In contrast, if the content of a call includes topics relating to mathematics, the use of the phonetic term "pi" may be associated with information related to the number pi (3.1415972). Further, if the content of a call includes topics relating to gardening, the use of the phonetic term "flower" may be associated with information related to the cultivation of flowers. In additional embodiments, a first caller may use DTMF tones rather than keywords to access supplemental information. For example, a first caller may dial into a phone a particular code to retrieve the latest score of a football game.

In embodiments, the volume of auditory information originating from the first caller may be decreased or muted while the first caller is accessing the supplemental information so as to prevent interruption of the call. Additionally, while embodiments of the present invention have discussed whispers within the context of a first caller initiating a call, embodiments may also include a first caller receiving a call from a second caller. Using DTMF tones, keywords, or both, the first caller may initiate or cease the use of the information system to provide supplemental information independent of whether the caller initiates or receives a call.

Once an input, such as a keyword or DTMF tone, has been detected, supplemental information associated with the input may be retrieved. In embodiments, supplemental information may be stored in association with the keyword, the DTMF tone, or both. Alternatively, a search for supplemental information may be conducted in response to the detection of a keyword or DTMF tone. Once supplemental information has been identified, the supplemental information may be filtered or translated in accordance with user preferences of the first caller. For example, supplemental information may be filtered to prioritize particular interests of a caller, such as filtering news to prioritize stories related to favored athletes on a particular sports team. Further, supplemental information may be translated from a first language to a second language. Alternatively, the supplemental information may be translated from a non-audio format to an audio format. The supplemental information may then be presented to the first caller.

Figure 1:
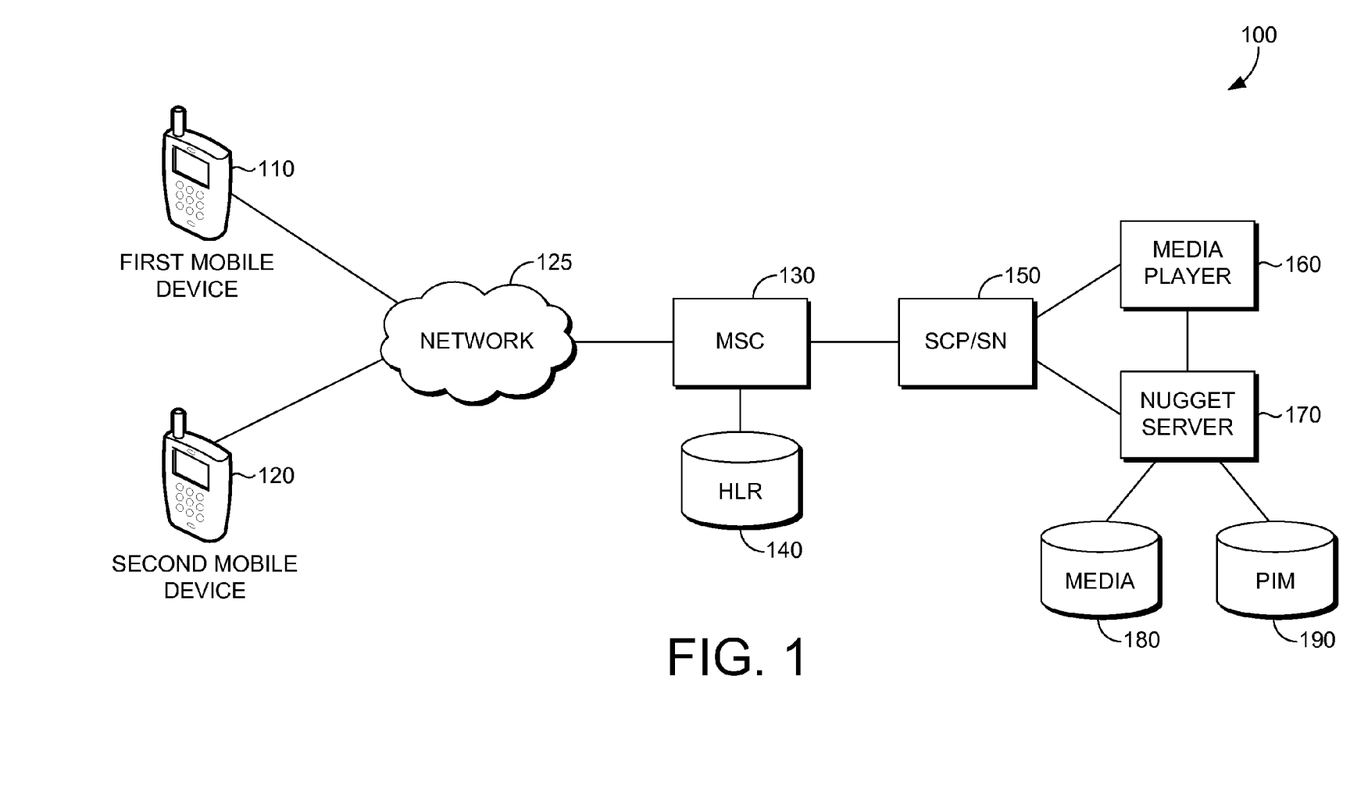
FIG. 1 is a block diagram illustrating a computing system for providing supplemental information to callers during a call, in accordance with an embodiment of the present invention.

Turning now to FIG. 1, an illustrative computing system 100 is presented for providing supplemental information to callers during a call, in accordance with an embodiment of the present invention. As shown in FIG. 1, computing system 100 includes a first mobile device 110, a second mobile device 120, a mobile switching center (MSC) 130, a home location register (HLR) 140, a service control point/service node (SCP/SN) 150, a media player 160, a nugget server 170, a media database 180, and a personal information management (PIM) database 190. MSC 130 includes a location of a Digital Access and Cross-Connect System (DACS) in a cellular telephone network. HLR 140 is a database that holds subscription information about every subscriber in a cellular network. Media player 160 is a server for text to speak, DTMF tone recognition, and speech recognition functions to play or detect stimuli that may query nugget server 170. Nugget server 170 is a core system for managing supplemental information sessions, resources, queries into databases, and federation of information between databases and media player 160. Media database 180 is a third party media database containing up-to-date information on news or current affairs, such as weather, news, sports, business information, stocks, etc. PIM database 190 is a personal information management database that includes customers or subscribers to nugget service 170. Information may be synchronized between various components of user information, such as calendars, contacts, business systems, and an exchange server.

The first mobile device 110, second mobile device 120, and MSC 130 can communicate by way of network 125. Network 125 can be wired, wireless, or both. Network 125 can be a single network or can include multiple networks. Network 125 may also be a network of networks. Network 125 is shown in more simple form so as to not obscure other aspects of the present invention. For example, network 125 may include one or more wide area networks (WANs), one or more local area networks (LANs), one or more public networks, such as the Internet, or one or more private networks. Network 125 may include an array of devices, which are not shown so as to not obscure more relevant aspects of the invention. In a wireless telecommunications network, components such as a base station, a communications tower, or even access points (as well as other components) can provide wireless connectivity. Although single components are illustrated for clarity, one skilled in the art will appreciate that network 125 can enable communication between any number of mobile devices.

First mobile device 110 and second mobile device 120 can be any mobile device that is capable of communication, web accessibility, or both. As such, first mobile device 110 and second mobile device 120 may take on a variety of forms, such as a personal computer (PC), a laptop computer, a mobile phone, a personal digital assistance (PDA), a MP3 player, a video player, a handheld communications device, a workstation, any combination of these devices, or any other device that is capable of communication or web accessibility. In one embodiment, first mobile device 110 and second mobile device 120 is a mobile device that utilizes a wireless telecommunications network to communicate. Manufacturers of illustrative mobile devices include, for example, Research in Motion® of Waterloo, Canada; Creative Technologies Corp. of Brooklyn, N.Y.; Samsung® of Seoul, Korea; Nokia® of Espoo, Finland; LG® of Seoul, Korea; Motorola® of Schaumburg, Ill.; and Apple® Computer of Cupertino, Calif. A mobile device can include, for example, a display, a processor, a power source (e.g., a battery), a data store, a speaker, memory, a buffer.

A first caller of a mobile device, such as first mobile device 110, may initiate a call with a second caller of another mobile device, such as second mobile device 120. During the call, the information communicated between the first caller and second caller may be analyzed. In particular, one or more keywords may be provided by the first caller to a keyword monitoring service to be monitored. After analyzing the information communicated between the first caller and the second caller, a determination is made whether a keyword has been spoken. Once a keyword has been detected, a determination is made whether there is supplemental information related to that keyword. Supplemental information includes information that is related to the content of the call, calling parties of the call, or both. For example, supplemental information may include personal information relating to contacts, such as educational background, names of family members, or dates that are important to the contacts (birthdays, anniversaries, etc.). Supplemental information may also include social networking information, such as social networking status updates of parties on a call.

Additionally, supplemental information may be used to provide updates related to the weather, directions, or the location of parties on a call, such as GPS-based locations. Further, supplemental information may also include information about user behavior of parties on a call. For instance, supplemental information may include reading lists of favored books, movie rental history, and television channel viewing history. Additionally, business information may be provided as supplemental information. For example, business information may include recent sales orders or purchases, project information, service outages, news headlines, stock prices, or peer company information.

In order to make a determination whether there is supplemental information related to a keyword, a system may be used to manage resources available to provide supplemental information to the first caller. For instance, a nugget server, such as nugget server 170, may be used to query databases, manage information supplemented to calling sessions, and federate information from databases to a media player. Once a keyword has been detected, the nugget server may query a personal information management (PIM) database, such as PIM database 190, to determine whether there is supplemental information associated with the keyword.

For example, if the first caller is speaking to the second caller, who is an energy executive, the first caller may store information about the executive's spouse under a keyword such as "home." In this example, when the first caller says to the second caller, "it must be nice to be home," the first caller may be provided supplemental information relating to the second caller, such as the name of the second caller's spouse. The supplemental information may be provided by detecting the keyword "home," determining that supplemental information is associated with the keyword "home," then retrieving the supplemental information from a PIM database.

Once the supplemental information is retrieved, the supplemental information may be sent to the first caller by way of a media player that translates the supplemental information to an audible recording that is played to the first caller. The supplemental information may be presented as a whisper to the first caller in an audible format at a volume that is at least a threshold amount softer than the average call volume of the second caller. In this way, by gauging the volume of the whisper based on an acceptable call volume of the second caller, the first caller is able to hear the supplemental information, but not be interrupted by the supplemental information. Further, a second threshold may be set to indicate a minimum volume required to provide the supplemental information, such that the information provided is audible to the first caller.

In another example, a first caller may set up a recurring news update related to keywords that are associated with the second caller. For instance, if a first caller is in communication with a second caller who is en route to the airport to catch a flight, the first caller may set up a periodic update of the status of the flight. In this way, the first caller may indicate to the second caller if the flight is delayed or canceled. In another example, a first caller may set up a periodic update of a sporting event. For instance, the first caller may be updated with the current score of the sporting event every five minutes. Alternatively, the first caller may be updated every time a particular team scores a point. For example, if the first caller is interested in a football game, the first caller may be updated each time the teams scores. In this way, the first caller, who has an obligation to be on the call during an important game, may keep up-to-date with the most recent football scores.

Periodic information may be provided to a caller by the system searching a database that updates real-time information related to weather, sports, news, business, etc. Alternatively, a caller may subscribe to a news listing service that can send alerts to the caller when news items of interest are available. These news items of interest may then be forwarded to the caller using an information system as discussed above.

Figure 2:
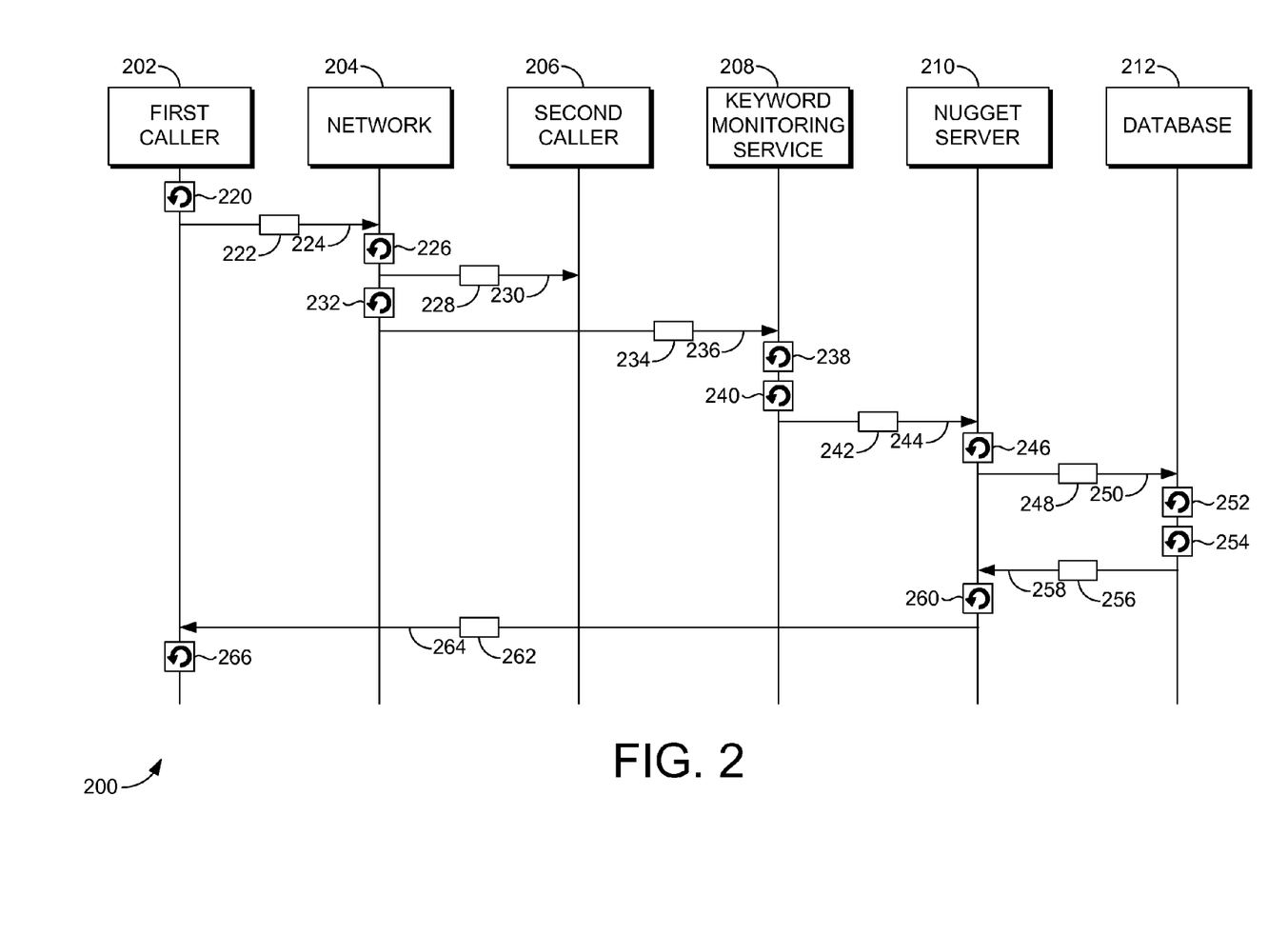
FIG. 2 is a flow diagram illustrating an implementation of a method of providing supplemental information to callers during a call, in accordance with an embodiment of the present invention.

FIG. 2 is a flow diagram 200 illustrating an implementation of a method of providing supplemental information to callers during a call, in accordance with an embodiment of the present invention. In particular, FIG. 2 illustrates flow diagram 200 for providing supplemental information in response to a detection of a keyword during a call. Initially, first caller 202 generates 220 a call request 222. In particular, the call request 222 includes a request to initiate the call between the first caller 202 and the second caller 206. The call request 222 is transmitted 224 to a network 204. The network 204 initiates 226 the call between the first caller 202 and the second caller 206. In particular, the network 204 provides 230 a connection 228 to second caller 206 to initiate 226 the call between the first caller 202 and the second caller 206.

At 232, information 234 communicated in the call is collected and transmitted 236 to a keyword monitoring service 208. The keyword monitoring service 208 monitors 238 the information 234 communicated during the call. Further, it is determined 240 that a first keyword has been communicated during the call. Based on the determination 240, a request 242 is sent 244 to a nugget server 210. In particular, the request 242 is sent 244 to determine whether there is supplemental information associated with the first keyword. At 246, the nugget server 210 generates a query 248. In particular, the query 248 contains the first keyword. The query 248 is transmitted 250 to a database 212. At 252, a first set 256 of supplemental information is identified. In particular, the first set 256 of supplemental information is associated with the first keyword. The first set 256 of supplemental information is retrieved 254 from the database 212, and is sent 258 to the nugget server 210. At the nugget server 210, a message 262 is generated 260, the message including the first set 256 of supplemental information. The message 262 is then sent 264 to the first caller 202. The message 262 is received 266 by the first caller 202 and provided 264 to the first caller 202 during the call.

Figure 3:
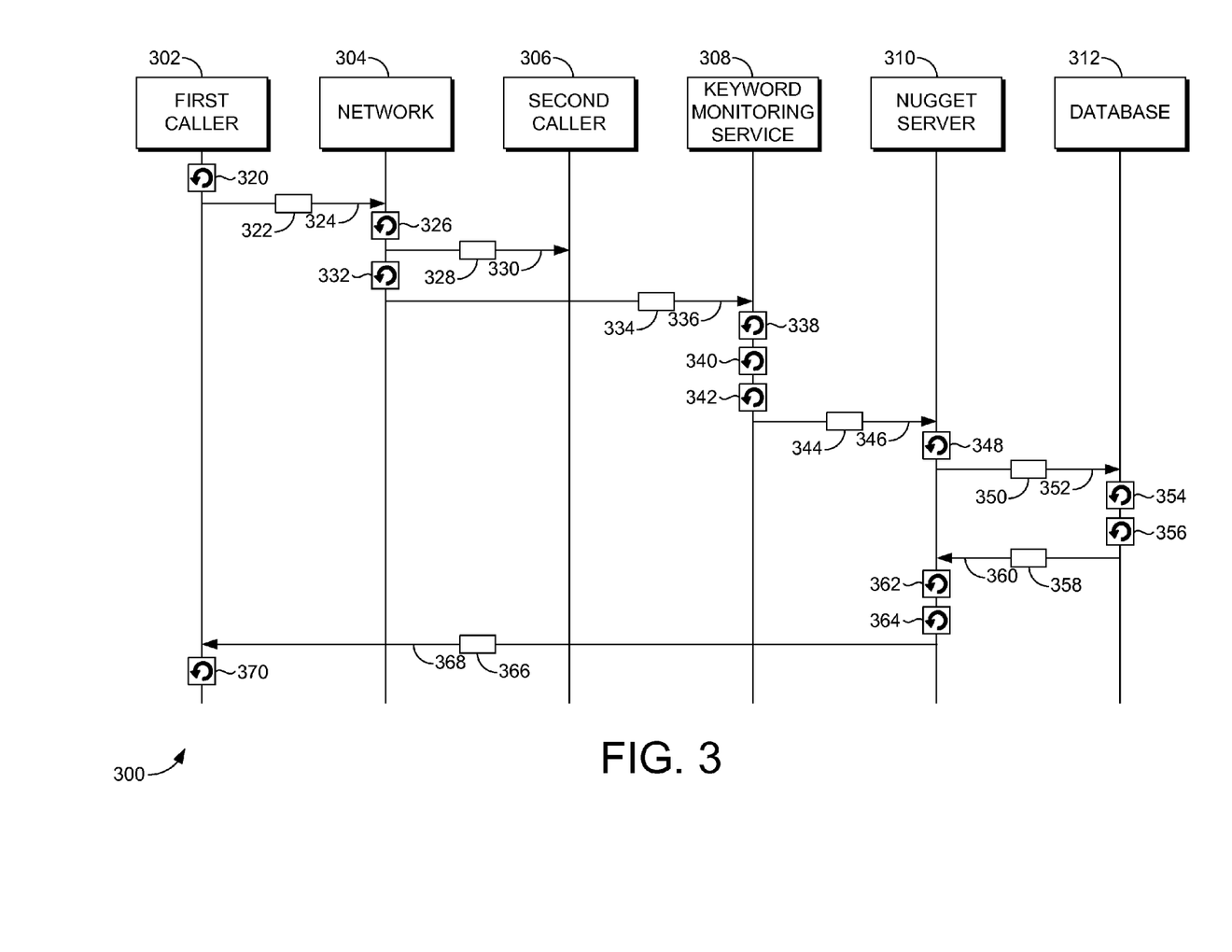
FIG. 3 is another flow diagram illustrating an implementation of a method of providing supplemental information to callers during a call, in accordance with an embodiment of the present invention.

FIG. 3 is another flow diagram 300 illustrating an implementation of a method of providing supplemental information that is translated into an audible format to callers during a call, in accordance with an embodiment of the present invention. In particular, FIG. 3 provides flow diagram 300 for providing supplemental information in response to detection of a keyword during the call. Initially, first caller 302 generates 320 a call request 322. In particular, the call request 322 includes a request to initiate a call between the first caller 302 and the second caller 306. The call request 322 is transmitted 324 to a network 304. The network 304 initiates 326 a call between the first caller 302 and the second caller 306. In particular, the network 304 provides 330 a connection 328 to second caller 306 to initiate 326 the call between the first caller 302 and the second caller 306.

At 332, information 334 communicated in the call is collected and transmitted 336 to a keyword monitoring service 308. The keyword monitoring service 308 monitors 338 the information 334 communicated during the call. Further, an average auditory volume of a second caller is determined 340 based on the information 334 communicated during the call. Additionally, it is determined 342 that a keyword has been communicated during a call. Based on the determination 342, a request 344 is sent 346 to a nugget server 310. In particular, the request 344 is sent 346 to determine whether there is supplemental information associated with the keyword. At 348, the nugget server 310 generates a query 350. In particular, the query 350 contains the keyword. The query 350 is transmitted 352 to a database 312. At 354, a first set 358 of supplemental information is identified. In particular, the first set 358 of supplemental information is associated with the keyword. The first set 358 of supplemental information is retrieved 356 from the database 312, and is sent 360 to the nugget server 310. At the nugget server 310, the first set 358 of supplemental information is translated 362 into an audible format. Further, a message 366 is generated 364, the message 366 including the first set 358 of supplemental information. The message 366 is then sent 368 to the first caller 302. The message 366 is received 370 by the first caller 302 and provided 368 to the first caller 302 during the call.

Figure 4:
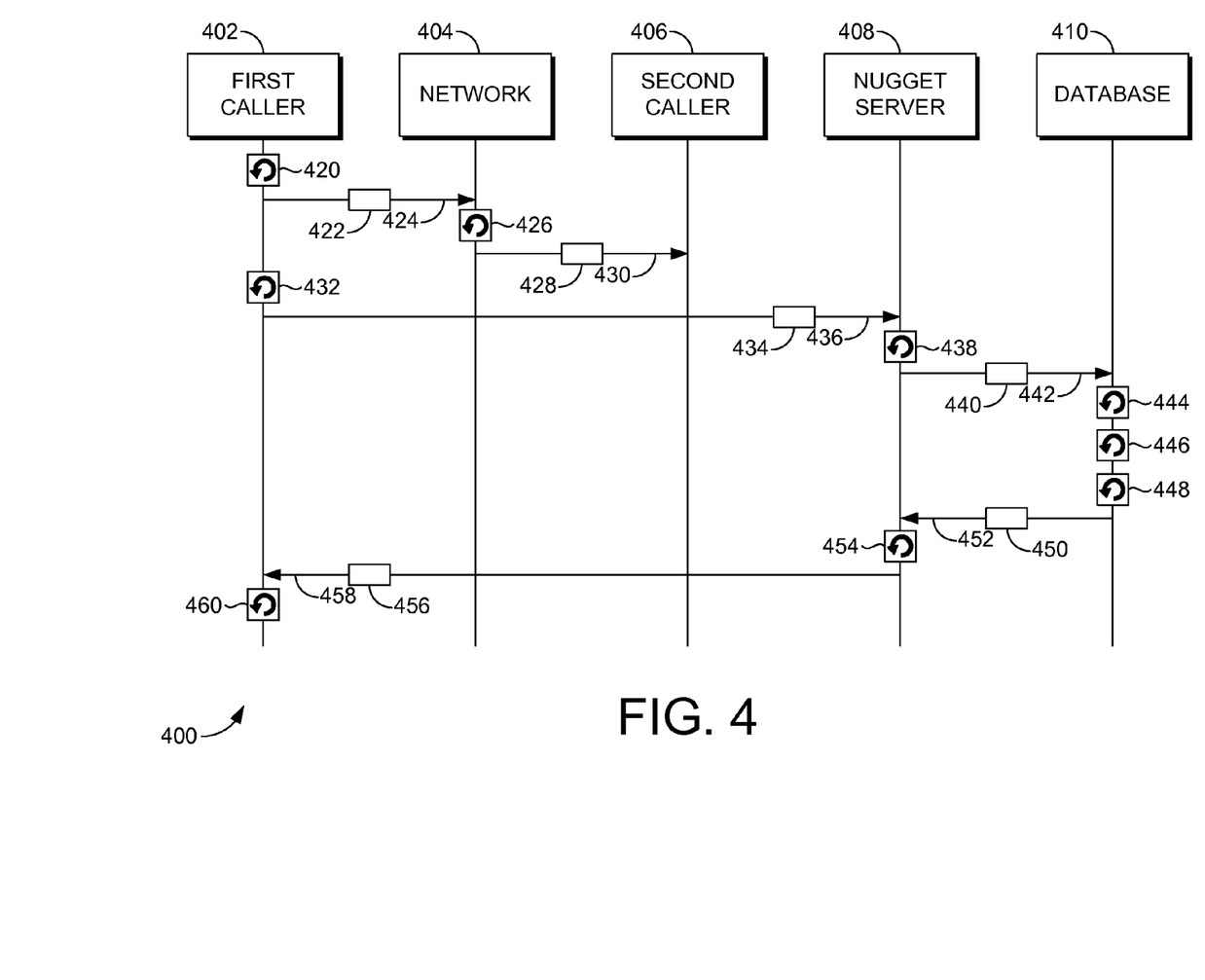
FIG. 4 is a further flow diagram illustrating an implementation of a method of providing supplemental information to callers during a call, in accordance with an embodiment of the present invention.

FIG. 4 is a further flow diagram 400 illustrating an implementation of a method of providing supplemental information to callers during a call, in accordance with an embodiment of the present invention. In particular, FIG. 4 provides flow diagram 400 for providing updated supplemental information during the call. Initially, first caller 402 generates 420 a call request 422. In particular, the call request 422 includes a request to initiate a call between the first caller 402 and the second caller 406. The call request 422 is transmitted 424 to a network 404. The network 404 initiates 426 the call between the first caller 402 and the second caller 406. In particular, the network 404 provides 430 a connection 428 to the second caller 406 to initiate 426 the call between the first caller 402 and the second caller 406.

Once the call is initiated 426 between the first caller 402 and the second caller 406, a request 434 for supplemental information updates is generated 432 at first caller 402. The request 434 is transmitted 436 to a nugget server 408. The nugget server 408 generates 438 a query 440. In particular, the query 440 contains the request for supplemental information updates. Additionally, the request may include information on how often the query should be sent for periodic supplemental information updates. The query 440 is transmitted 442 to a database 410. At 444, a determination is made whether a period search is required. If a search is required, a first set 450 of supplemental information is identified 446. The first set 450 of supplemental information is retrieved 448 from the database 410, and is sent 452 to the nugget server 408. At the nugget server 408, a message 456 is generated 454, the message 456 including the first set 450 of supplemental information. The message 456 is then sent 458 to the first caller 402. The message 456 is received 460 by the first caller 402 and provided 458 to the first caller 402 during the call.

Figure 5:
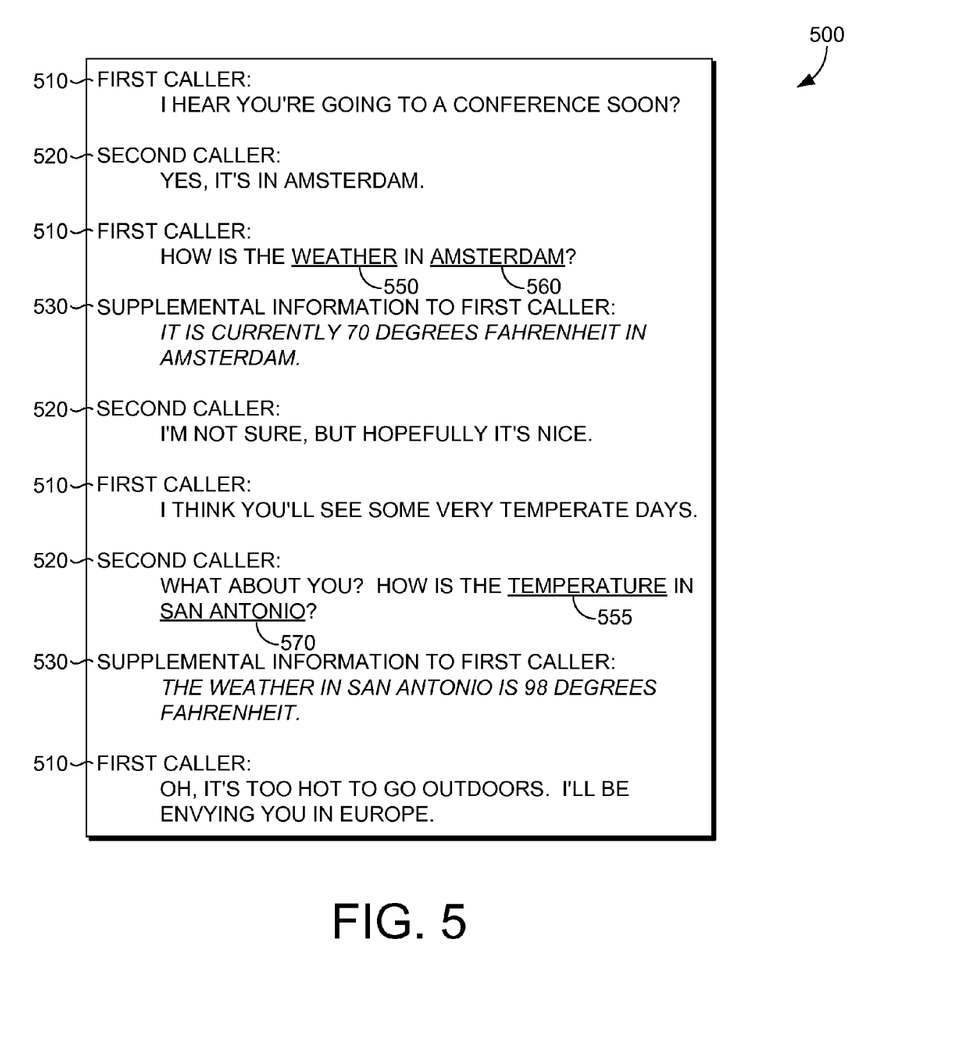
FIG. 5 is a schematic diagram illustrating supplemental information presented in response to detection of keywords communicated during a call, in accordance with an embodiment of the present invention.

FIG. 5 is a schematic diagram illustrating supplemental information 500 presented in response to detection of keywords communicated during a call, in accordance with an embodiment of the present invention. In particular, FIG. 5 illustrates a conversation between a first caller 510 and a second caller 520. In the conversation illustrated in FIG. 5, first caller 510 initiates a keyword 550 by asking about the weather. In embodiments, a keyword monitoring system may seek out related words as secondary keywords. Secondary keywords may be used to clarify the type of supplementary information that is desired from a caller. Further, while keywords may be provided by the first caller 510, supplementary keywords may not be explicitly provided by the first caller 510, but rather may be determined by a nugget server or other component of a system, such as computing system 100, used in accordance with embodiments of the present invention.

As such, the identification of the keyword 550 "weather" may initiate a query into surrounding text, from the first caller 510 and second caller 520, to clarify the context of the keyword. In FIG. 5, a supplementary keyword 560 of "Amsterdam" may be identified. As such, when a determination is made whether there is supplementary information 530 associated with the keyword 550 "weather," the search may be narrowed or results may be re-ordered based on the supplementary keyword 560 "Amsterdam." Accordingly, supplemental information 530 associated with keyword 550 "weather" may focus on the temperature in Amsterdam. FIG. 5 also illustrates a second caller 520 who initiates a keyword 555 "temperature." Similarly, a supplementary keyword 570 "San Antonio" may be identified to help clarify the supplemental information 530 associated with keyword 555 "temperature." Accordingly, supplemental information 530 associated with keyword 555 "temperature" may focus on the temperature in San Antonio.

In embodiments, the providing of supplemental information 530 may be based on whether a keyword is spoken by the first caller 510, the second caller 520, or either caller. Under an embodiment where the providing of supplemental information 530 is based upon a keyword only being spoken by the first caller 510, the keyword 550 "weather" would be recognized. However, the keyword 555 "temperature" would *not* be recognized. Similarly, under an embodiment where the providing of supplemental information 530 is based upon a keyword only being spoken by the second caller 520, however, the keyword 550 "weather" would *not* be recognized. However, the keyword 555 "temperature" would be recognized. Additionally, under an embodiment where the providing of supplemental information 530 is based on the keyword, but independent of the source of the keyword spoken, the keyword 550 "weather" and the keyword 555 "temperature" would both be recognized.

Figure 6:
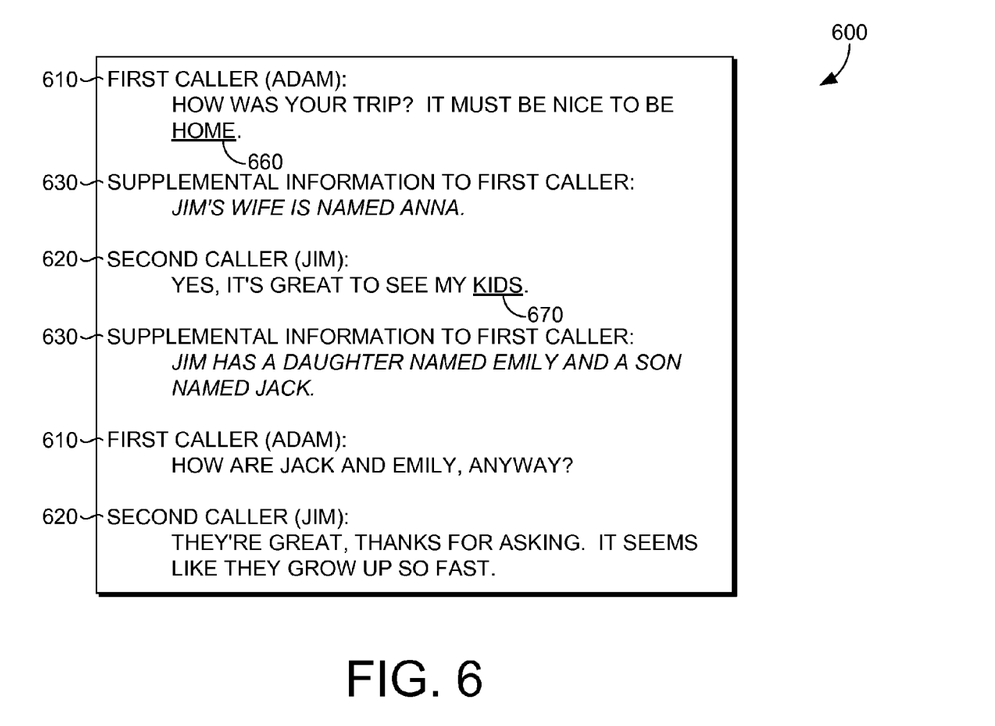
FIG. 6 is a schematic diagram illustrating supplemental information based on information associated with a second caller presented in response to detection of keywords communicated during a call, in accordance with an embodiment of the present invention.

FIG. 6 is a schematic diagram illustrating supplemental information 600 based on information associated with a second caller 620 presented in response to detection of keywords communicated during a call, in accordance with an embodiment of the present invention. In particular, FIG. 6 illustrates a conversation between a first caller 610 and a second caller 620. As illustrated in FIG. 6, the content of the supplemental information 630 provided to the first caller 610 is associated with the second caller 620. Further, the providing of supplemental information 630 to the first caller 610 is independent of the source of a keyword. As such, when first caller 610 mentions keyword 660 "home," supplemental information 630 that relates to the spouse of the second caller 620 (Jim) is provided to the first caller 610. Additionally, when the second caller 620 mentions keyword 670 "kids," supplemental information 630 that relates to the kids of the second caller 620 (Jim) is provided to the first caller 610.

Figure 7:
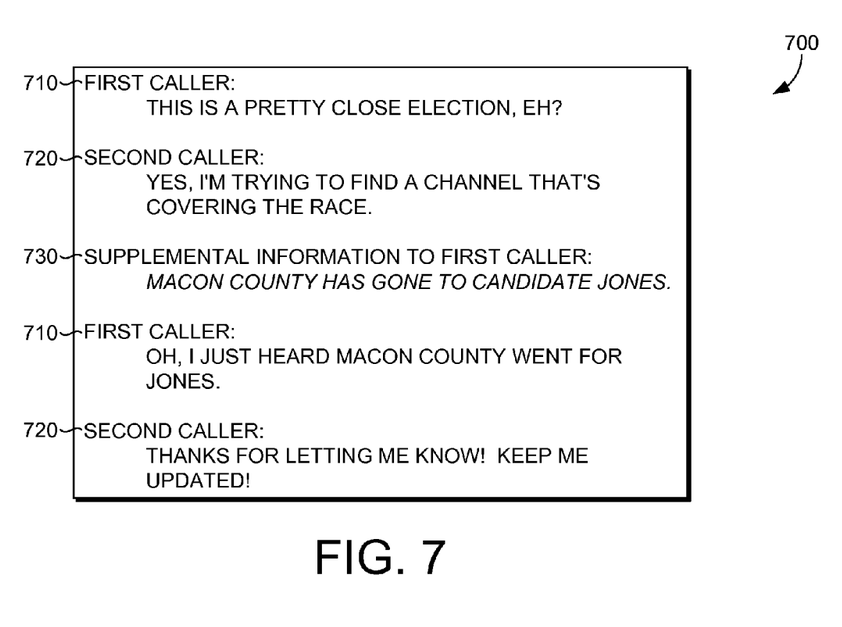
FIG. 7 is a schematic diagram illustrating supplemental information presented in response to an updated news report, in accordance with an embodiment of the present invention.

FIG. 7 is a schematic diagram illustrating supplemental information 700 presented in response to an updated news report, in accordance with an embodiment of the present invention. In particular, FIG. 7 illustrates a conversation between a first caller 710 and a second caller 720. As illustrated in FIG. 7, first caller 710 has requested supplemental information 730 to be provided to first caller 710 as news breaks relating to an election. As such, first caller 710 will be provided supplemental information 730 relating to the news update if and only if an update is provided by a news service or news database.

Figure 8:
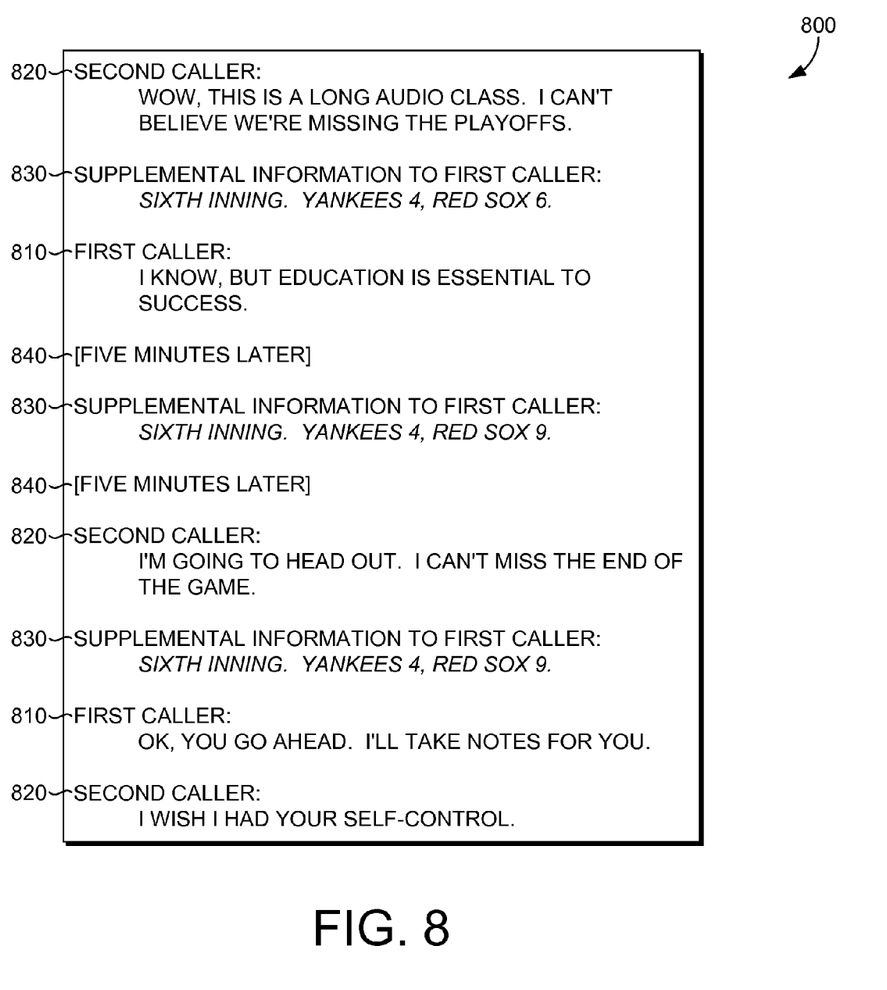
FIG. 8 is a schematic diagram illustrating supplemental information presented in response to periodic updates, in accordance with an embodiment of the present invention.

In contrast, FIG. 8 is a schematic diagram illustrating supplemental information 800 presented in response to periodic updates, in accordance with an embodiment of the present invention. In particular, FIG. 8 illustrates a conversation between a first caller 810 and a second caller 820. As illustrated in FIG. 8, first caller 810 has requested supplemental information 830 to be provided to first caller 810 on a periodic basis relating to a sports game. For example, first caller 810 may request to have supplemental information 830 provided in five minute increments 840. As such, first caller 810 will be provided supplemental information 830 relating to the sports game even if the content of the supplemental information does not change.

Figure 9:
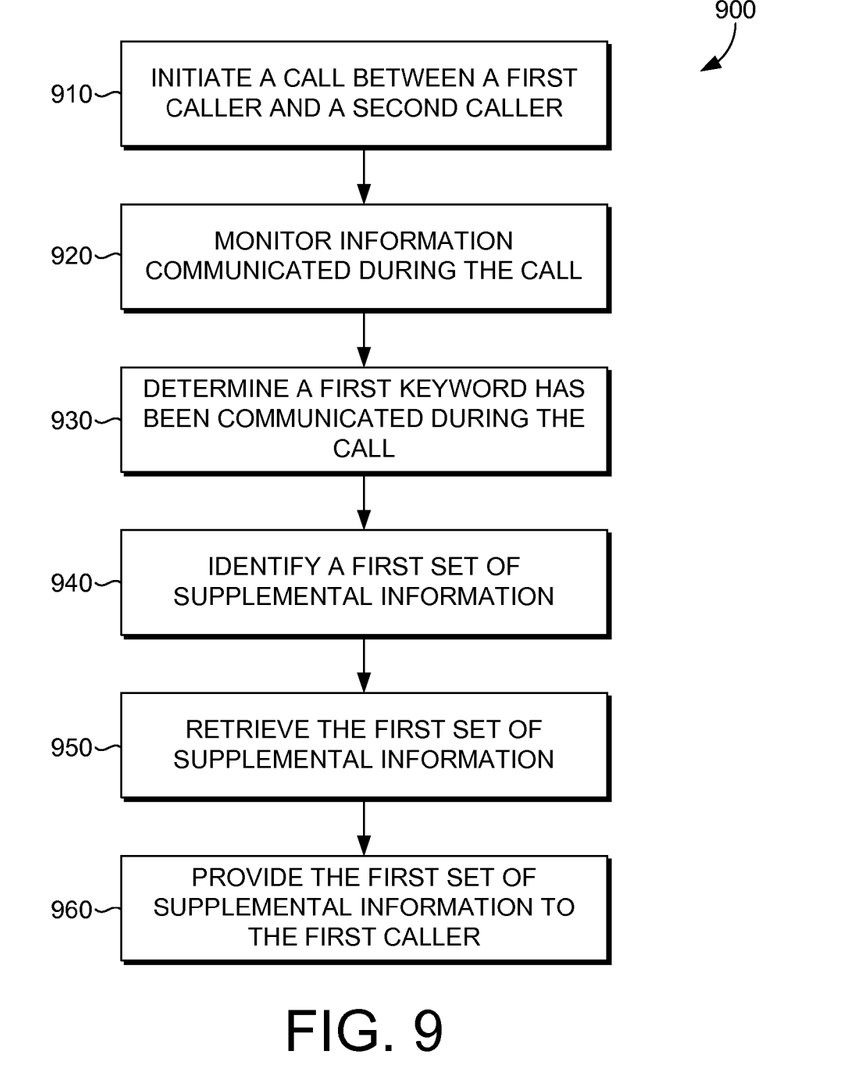
FIG. 9 is a flow diagram illustrating an implementation of a method of providing supplemental information to callers during a call, in accordance with an embodiment of the present invention.

FIG. 9 is a flow diagram 900 illustrating an implementation of a method of providing supplemental information to callers during a call, in accordance with an embodiment of the present invention. At block 910, a call is initiated (226) between a first caller (202) and a second caller (206). At block 920, information (234) communicated during the call is monitored (238). At block 930, a determination (240) is made that a first keyword has been communicated during the call. The determination (240) is based on an analysis of the information (234) communicated during the call. In embodiments, the keyword may be spoken by the first caller. Further, the recognition that a keyword has been spoken may be based on a caller identifier (e.g., "first caller," "second caller," "Jim," mobile phone number, etc.) associated with the call. As such, a first keyword associated with a first set of supplemental information may be recognized when the first keyword is spoken by the first caller, but not when the first keyword is spoken by the second caller. Further, and possibly within the same call, a second keyword associated with a second set of supplemental information may be recognized when the second keyword is spoken by the second caller, but not when the second keyword is spoken by the first caller. In alternative embodiments, the recognition that a keyword has been spoken may be independent of a caller identifier.

At block 940, a first set of supplemental information (254) is identified (252). In particular, the first set of supplemental information (254) is associated with the first keyword. Further, the first set of supplemental information (254) is stored in a database (212). At block 950, the first set of supplemental information (254) is retrieved from the database (212). At block 960, the first set of supplemental information (262) is provided (264) to the first caller (202). In particular, the first set of supplemental information (262) is provided (264) to the first caller (202) during the call.

Figure 10:
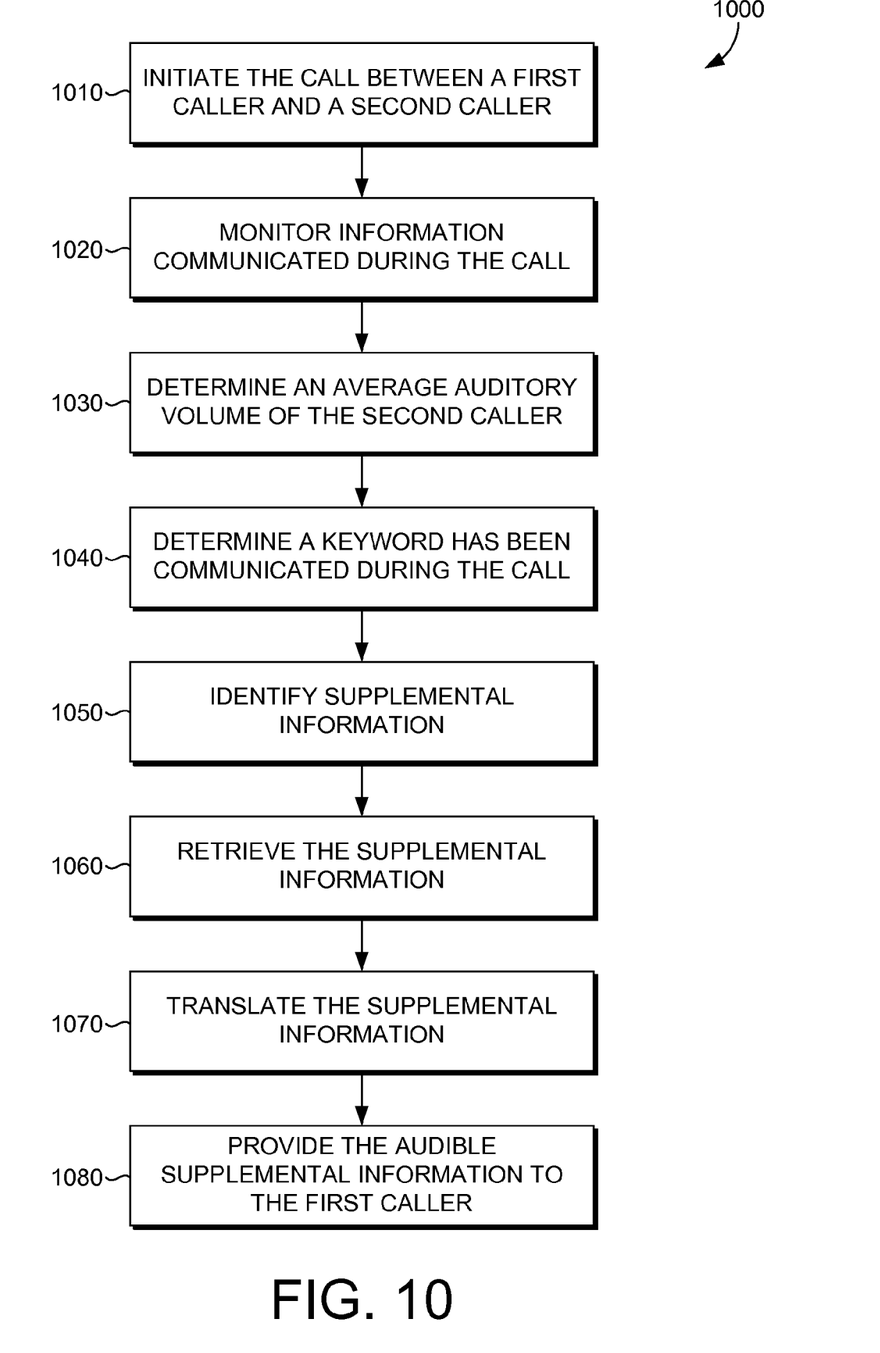
FIG. 10 is a flow diagram illustrating another implementation of a method of providing supplemental information to callers during a call, in accordance with an embodiment of the present invention.

FIG. 10 is a flow diagram 1000 illustrating another implementation of a method of providing supplemental information to callers during a call, in accordance with an embodiment of the present invention. At block 1010, a call is initiated (326) between a first caller (302) and a second caller (306). At block 1020, information (334) communicated during the call is monitored (338). At block 1030, an average auditory volume of the second caller is determined (340). In particular, the average auditory volume of the second caller is determined (340) based on an analysis of information (334) communicated during the call. At block 1040, a determination (342) is made that a keyword has been communicated during the call. In particular, the determination (342) that a keyword has been communicated during the call is based on the analyzing of information communicated during the call.

At block 1050, supplemental information (358) is identified (354). The supplemental information (358) is associated with the keyword. In embodiments, the content of the supplemental information may be dependent on the content of a call. For instance, if a call is related to the topics of engineering, the word "pi" may be interpreted as a mathematical constant. Alternatively, if a call is related to the topics of cooking, the word "pie" may be interpreted as a pastry.

At block 1060, the supplemental information (358) is retrieved (356). The supplemental information (358) may be retrieved (356) from a media database (180). Alternatively, the supplemental information (358) is retrieved (356) from a personal information management database (190). At block 1070, the supplemental information (358) is translated (362) into an audible format. In embodiments, the supplemental information may be translated from a text-based format to an audio format. Alternatively, the supplemental information may be translated from a first language in an audible format to a second language in an audible format. The supplemental information may be translated into an audible format using a nugget server (310). At block 1080, the audible supplemental information (364) is provided (366) to the first caller (302). In particular, the audible supplemental information (364) is provided to the first caller (302) during the call. Further, the audible supplemental information (364) is provided (366) to the first caller (302) during the call at a volume at least a threshold amount softer than the average audible volume of the second caller.

Figure 11:
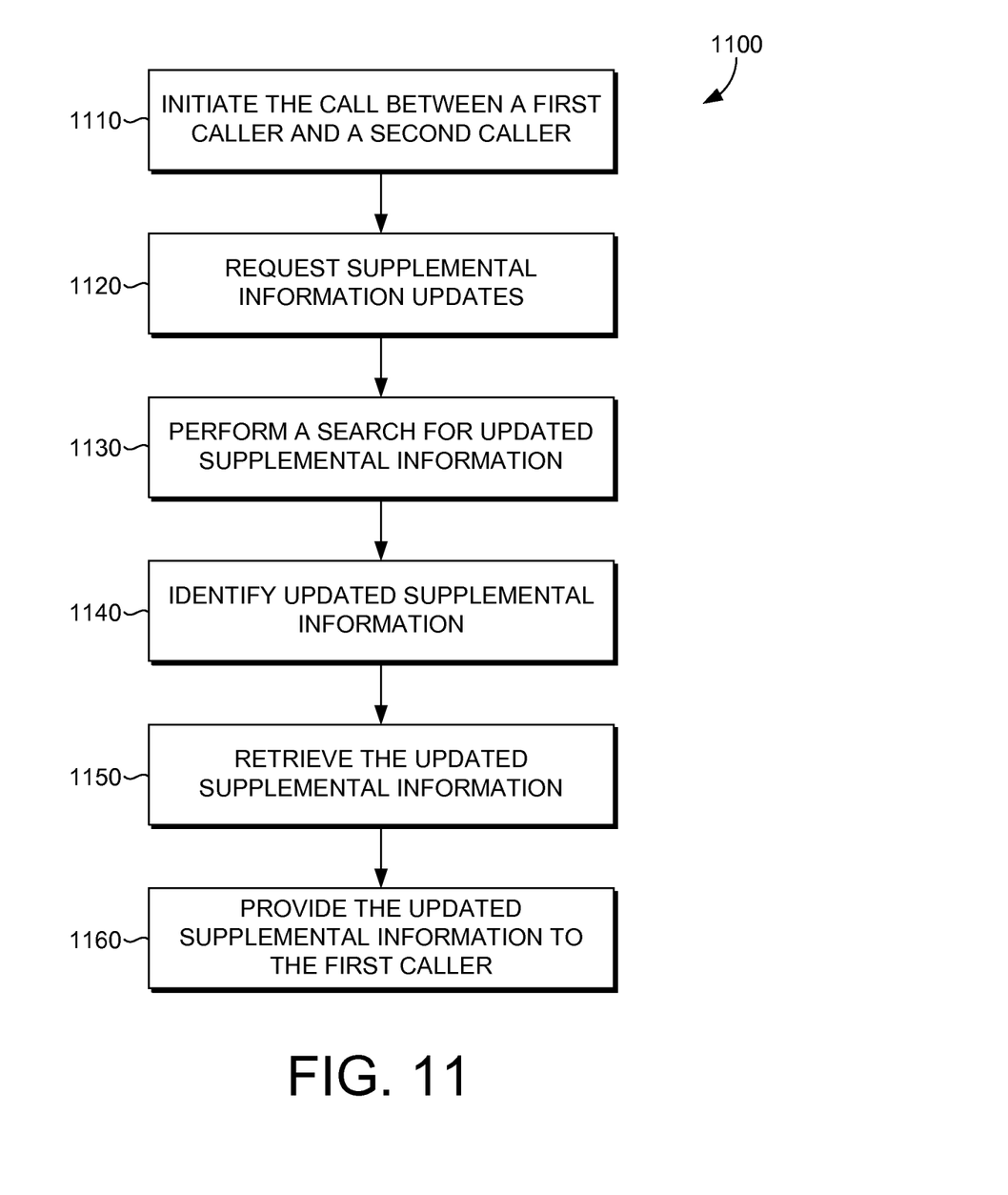
FIG. 11 is a flow diagram illustrating a further implementation of a method of providing supplemental information to callers during a call, in accordance with an embodiment of the present invention.

FIG. 11 is a flow diagram 1100 illustrating a further implementation of a method of providing supplemental information to callers during a call, in accordance with an embodiment of the present invention. At block 1110, a call is initiated (426) between a first caller (402) and a second caller (406). At block 1120, supplemental information updates are requested (434). The supplemental updates may be associated with the second caller (406). At block 1130, a periodic search is performed (444). In particular, a periodic search is performed (444) for updated supplemental information (450). In embodiments, a period search may be performed in a media database. Alternatively, a periodic search may be conducted in a personal information management database. Further, the periodic search may be initiated by a first caller. In particular, the periodic search may be initiated by a first caller inputting a set of pre-defined DTMF tone.

At block 1140, updated supplemental information (450) is identified (446). At block 1150, the updated supplemental information (450) is retrieved (448). In embodiments, the updated supplemental information may be translated. For instance, the updated supplemental information may be translated from a text-based format to an audible format. Further, the updated supplemental information may be translated from a language unknown to the first caller to a language known to the first caller. At block 1160, the updated supplemental information (456) is provided (458). In particular, the updated supplemental information (456) is provided (458) to the first caller (402) during the call.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of providing supplemental information to callers during a call, the method comprising:
   initiating, by a network, the call between a call requestor and call receiver, wherein the call requestor generates a request to initiate the call;
   monitoring, by a keyword monitoring service, information communicated during the call;
   analyzing, by the keyword monitoring service, the information communicated during the call to determine a context of the information communicated during the call;
   determining, by the keyword monitoring service, that a keyword has been communicated during the call based on the analysis of the information communicated during the call;
   requesting, by the keyword monitoring service, that a server determine whether there is supplemental information associated with the keyword;
   identifying, by the server, a set of supplemental information that is associated with the keyword based on the context of the information communicated during the call, wherein the set of supplemental information is stored in a database;
   retrieving, by the server, the set of supplemental information from the database; and
   providing, by the server, the set of supplemental information to the call requestor during the call.

2. The method of claim 1, wherein the set of supplemental information is associated with the call receiver.

3. The method of claim 1, wherein the keyword is spoken by the call requestor.

4. The method of claim 3, wherein the keyword is identified based on the keyword being spoken by the call requestor.

5. The method of claim 1, wherein the keyword is identified independent of a caller identifier.

6. The method of claim 1, further comprising:
   determining, by the keyword monitoring service, that a subsequent keyword has been communicated during the call based on the an analysis of the information communicated during the call;
   requesting, by the keyword monitoring service, that the server determine whether there is supplemental information associated with the subsequent keyword;
   identifying, by the server, a subsequent set of supplemental information that is associated with the subsequent keyword based on the context of the information communicated during the call, wherein the subsequent set of supplemental information is stored in the database;
   retrieving, by the server, the subsequent set of supplemental information from the database; and
   providing, by the server, the subsequent set of supplemental information to the call requestor during the call.

7. The method of claim 1, wherein the subsequent keyword is spoken by the call receiver.

8. The method of claim 7, wherein the subsequent keyword is identified based on the subsequent keyword being spoken by the call receiver.

9. A method of providing supplemental information to callers during a call, the method comprising:
   initiating, by a network, the call between a call requestor and a call receiver, wherein the call requestor generates a request to initiate the call;
   monitoring, by a keyword monitoring service, information communicated during the call;
   analyzing, by the keyword monitoring service, the information communicated during the call to determine a context of the information communicated during the call;
   determining, by the keyword monitoring service, an average auditory volume of the call receiver based on the analysis of the information communicated during the call;
   determining, by the keyword monitoring service, that a keyword has been communicated during the call based on the analysis of the information communicated during the call;
   requesting, by the keyword monitoring service, that a server determine whether there is supplemental information associated with the keyword;
   identifying, by a server, the supplemental information that is associated with the keyword based on the context of the information communicated during the call;
   retrieving, by the server, the supplemental information;
   translating, by the server, the supplemental information into audible supplemental information; and
   providing, by the server, the translated audible supplemental information to the call requestor during the call at a volume at least a threshold amount softer than the average audible volume of the call receiver such that the call requester is able to hear the supplemental information, but not be interrupted by the supplemental information.

10. The method of claim 9, wherein translating the supplemental information into the audible supplemental information comprises translating the supplemental information from a text-based format to an audible format.

11. The method of claim 9, wherein the supplemental information is retrieved from a personal information management database.

12. A method of providing supplemental information to callers during a call, the method comprising:
   initiating, by a network, the call between a call requestor and a call receiver, wherein the call requestor generates a request to initiate the call;
   monitoring, by a keyword monitoring service, information communicated during the call;
   analyzing, by the keyword monitoring service, the information communicated during the call to determine a context of the information communicated during the call;
   determining, by the keyword monitoring service, that a keyword associated with the call receiver has been communicated during the call based on the analysis of the information communicated during the call;
   requesting, by the keyword monitoring service, that a server determine whether there are supplemental information updates associated with the call receiver;
   periodically performing, by the server, a search through at least one database for the supplemental information updates;

identifying, by the server, the supplemental information updates based on the context of the information communicated during the call;

retrieving, by the server, the supplemental information updates from the at least one database; and providing, by the server, the supplemental information updates to the call requestor during the call.

13. The method of claim 12, wherein performing a search for the supplemental information updates comprises searching a media database.

14. The method of claim 12, wherein performing a search for the supplemental information updates comprises searching a personal information management database.

15. The method of claim 12, wherein performing a search for the supplemental information updates is initiated by the call requestor.

16. The method of claim 15, wherein the call requestor inputs a set of pre-defined DTMF tones to initiate the periodically performing a search for the supplemental information updates.

17. The method of claim 12, further comprising:
translating, by the server, the supplemental information updates.

18. The method of claim 12, wherein translating the supplemental information updates comprises translating the supplemental information updates from a text-based format to an audible format.

19. The method of claim 12, wherein translating the supplemental information updates comprises translating the supplemental information updates from a language unknown to the call requestor to a language known to the call requestor.

* * * * *